United States Patent
Rosinzonsky et al.

(10) Patent No.: US 11,842,322 B2
(45) Date of Patent: Dec. 12, 2023

(54) SMART CONTRACT INTERPRETER

(71) Applicant: Equinix, Inc., Redwood City, CA (US)

(72) Inventors: Edward Rosinzonsky, Menlo Park, CA (US); Danjue Li, Dublin, CA (US)

(73) Assignee: EQUINIX, INC., Redwood City, CA (US)

( * ) Notice: Subject to any disclaimer, the term of this patent is extended or adjusted under 35 U.S.C. 154(b) by 233 days.

(21) Appl. No.: 16/453,606

(22) Filed: Jun. 26, 2019

(65) Prior Publication Data

US 2020/0065763 A1 Feb. 27, 2020

Related U.S. Application Data

(60) Provisional application No. 62/721,242, filed on Aug. 22, 2018.

(51) Int. Cl.
*G06Q 10/10* (2023.01)

(52) U.S. Cl.
CPC .................. *G06Q 10/10* (2013.01)

(58) Field of Classification Search
CPC ... H04L 29/06; H04L 63/123; H04L 2209/38; G06F 21/60; G06F 21/602; G06Q 10/10
See application file for complete search history.

(56) References Cited

U.S. PATENT DOCUMENTS

| | | | |
|---|---|---|---|
| 10,701,054 B2 * | 6/2020 | Padmanabhan | ....... H04L 63/101 |
| 2018/0089638 A1 * | 3/2018 | Christidis | .......... G06Q 20/3829 |
| 2018/0248880 A1 * | 8/2018 | Sardesai | ............... H04L 63/101 |
| 2018/0260909 A1 * | 9/2018 | Li | ......................... H04L 9/0637 |
| 2018/0352033 A1 * | 12/2018 | Pacella | ................... H04L 67/10 |
| 2018/0365686 A1 * | 12/2018 | Kondo | .................. H04L 63/123 |

(Continued)

FOREIGN PATENT DOCUMENTS

| | | |
|---|---|---|
| CN | 106651303 A | 5/2017 |
| CN | 107341702 A | 11/2017 |

(Continued)

OTHER PUBLICATIONS

Christidis, "Blockchains and smart contract for the internet of things" (Year: 2016).*

(Continued)

*Primary Examiner* — Sangeeta Bahl
(74) *Attorney, Agent, or Firm* — Shumaker & Sieffert, P.A.

(57) ABSTRACT

This disclosure describes techniques that include interpreting information about a smart contract so that the terms of the smart contract can be implemented across a diverse array of consensus networks or blockchain platforms. In one example, this disclosure describes a method that includes receiving, by a first computing device, information describing a smart contract, wherein the first computing device is included within a first plurality of computing devices, each on a first consensus network that maintains a first distributed ledger; performing, by the first computing device and in response to receiving the information describing the smart contract, operations to update the first distributed ledger; and interpreting, by at least one of the first plurality of computing devices, the information describing the smart contract to determine and perform at least one of a plurality of first smart contract operations on the first consensus network.

20 Claims, 6 Drawing Sheets

(56) References Cited

U.S. PATENT DOCUMENTS

| | | | | |
|---|---|---|---|---|
| 2019/0034404 | A1* | 1/2019 | Anderson | G06Q 50/18 |
| 2019/0207749 | A1* | 7/2019 | McKellar | G06F 21/64 |
| 2019/0238525 | A1* | 8/2019 | Padmanabhan | H04L 63/0428 |
| 2019/0317936 | A1* | 10/2019 | Keskar | H04L 63/0428 |
| 2019/0324772 | A1 | 10/2019 | Fan et al. | |
| 2020/0019626 | A1* | 1/2020 | Todd | G06F 16/29 |
| 2020/0151842 | A1* | 5/2020 | O'Brien | G07F 17/3276 |

FOREIGN PATENT DOCUMENTS

| | | | | |
|---|---|---|---|---|
| CN | 107392619 | A | | 11/2017 |
| CN | 107819848 | A | | 3/2018 |
| CN | 107943950 | A | | 4/2018 |
| EP | 3545481 | A2 * | 10/2019 | G06F 21/00 |
| WO | 2017161417 | A1 | | 9/2017 |
| WO | 2018140913 | A1 | | 8/2018 |
| WO | 2019082100 | A1 | | 5/2019 |
| WO | 2019152750 | A1 | | 8/2019 |

OTHER PUBLICATIONS

Response to Communication Pursuant to Rules 161(1) and 162 EPC dated Novber 27, 2020, from counterpart European Application No. 19763146.8, filed May 24, 2021, 12 pp.

Response to Written Opinion filed in International Application No. PCT/US2019/047621 dated Jun. 22, 2020, 14 pp.

Second Written Opinion issued in International Application No. PCT/US2019/047621 dated Jul. 1, 2020, 5 pp.

Response to Second Written Opinion filed in International Application No. PCT/US2019/047621 dated Aug. 31, 2020, 4 pp.

Lee "Explaining Side Chains, The Next Breakthrough in Blockchain," Forbes, Feb. 7, 2008, 4 pp.

International Search Report and Written Opinion of International Application No. PCT/US2019/047621, dated Oct. 21, 2019, 13 pp.

"Solidity," Wikipedia, the Free Encyclopedia, lasted edited on Dec. 17, 2019, accessed on Jan. 20, 2020, 4 pp.

Barr, "AWS Blockchain Templates," Amazon Web Services, Retrieved from https://aws.amazon.com/blockchain/templates/, Apr. 19, 2018, 8 pp.

"Ivy for Bitcoin: a smart contract language that compiles to Bitcoin Script," Chain, Retrieved from https://web.archive.org/web/20180120182734/https://blog.chain.com/ivy-for-bitcoin-a-smart-contract-language-that-compiles-to-bitcoin-script-bec06377141a?gi=a2c9edbda637, Dec. 18, 2017, 4 pp.

"Build Secure Smart Contracts in Solidity," OpenZeppelin, Retrieved from https://openzeppelin.com/contracts/, accessed Jan. 30, 2020, 5 pp.

International Preliminary Report on Patentability from International Application No. PCT/US2019/047621, dated Nov. 18, 2020, 18 pp.

First Office Action and Search Report, and translation thereof, from counterpart Chinese Application No. 201980040101.2 dated Oct. 28, 2022, 15 pp.

Notice of Intent to Grant, in Chinese language, from counterpart Chinese Application No. 201980040101.2 dated Apr. 2, 2023, 2 pp.

Response to First Office Action dated Oct. 28, 2022, in the Chinese language, from counterpart Chinese Application No. 201980040101.2 filed Mar. 13, 2023, 10 pp.

Communication pursuant to Article 94(3) EPC from counterpart European Application No. 19763146.8 dated Aug. 23, 2023, 6 pp.

* cited by examiner

390A

```
data_model:
   "{{hash}}":
      name:
      counter:
      signatures:
      - name:
        date:
        pgp:

actions:
   create_doc:
   - creates: "{{hash}}"
   sign_doc:
   - appends: "{{hash}}.signatures"
   - increments: "{{hash}}.counter"
```

```
{
    "data_model": {
        "{{hash}}": {
            "counter": null,
            "name": null,
            "signatures": [
                {
                    "date": null,
                    "name": null,
                    "pgp": null
                }
            ]
        }
    },
    "actions": {
        "create_doc": [
            {
                "creates": "{{hash}}"
            }
        ],
        "sign_doc": [
            {
                "appends": "{{hash}}.signatures"
            },
            {
                "increments": "{{hash}}.counter"
            }
        ]
    }
}
```

FIG. 3B

SMART CONTRACT INTERPRETER

CROSS REFERENCE

This application claims the benefit of U.S. Provisional Patent Application No. 62/721,242 filed on Aug. 22, 2018, which is hereby incorporated by reference herein in its entirety.

TECHNICAL FIELD

This disclosure relates to computer networks, and more specifically, to consensus networks.

BACKGROUND

A distributed ledger is a data structure that may be shared and synchronized across a network spanning multiple sites, institutions, and/or geographies. Changes or additions made to the ledger are reflected and copied to many (if not all) computing devices (or nodes) on the network. Often, a distributed ledger is implemented on a consensus network, where nodes on the network implement a consensus algorithm intended to achieve reliability or agreement among nodes on the network, even where the network might include multiple unreliable or untrustworthy nodes.

A blockchain (e.g., the technology underlying Bitcoin and Ethereum) might be considered a distributed ledger that is managed by distributed computers on a peer-to-peer (P2P) network. Each peer (node) on the network maintains a copy of the ledger, and also uses additional measures to help ensure consensus among a majority of the nodes on the network. A smart contract is a computer program typically implemented on a consensus network as part of a blockchain or distributed ledger. Smart contracts may be used on a consensus network to facilitate, verify, and/or enforce the negotiation and/or performance of an agreement, contract, or other set of rules.

SUMMARY

This disclosure describes techniques that include interpreting information describing a smart contract so that the terms of the smart contract can be implemented across a diverse array of consensus networks or blockchain platforms. In some examples, techniques are disclosed herein that include communicating a template for a smart contract to one or more nodes of a consensus network. One or more nodes of a consensus network implement the smart contract in a manner appropriate for the consensus network and/or blockchain platform on which they reside, resulting in a smart contract executing on the consensus network that operates in a manner consistent with the terms and/or requirements specified by the template. In some implementations, the smart contract corresponding to the template may be implemented by a smart contract interpreter, which may itself be a separate smart contract executing on a consensus network or blockchain, that interprets the template and thereafter performs actions corresponding to the terms and/or requirements of the smart contract as specified by the template.

In one example, this disclosure describes a method comprising: receiving, by a first computing device, information describing a smart contract, wherein the first computing device is included within a first plurality of computing devices, each on a first consensus network that maintains a first distributed ledger; performing, by the first computing device and in response to receiving the information describing the smart contract, operations to update the first distributed ledger; interpreting, by at least one of the first plurality of computing devices, the information describing the smart contract to determine and perform at least one of a plurality of first smart contract operations on the first consensus network; receiving, by a second computing device, the information describing the smart contract, wherein the second computing device is included within a second plurality of computing devices, each on a second consensus network that maintains a second distributed ledger; performing, by the second computing device and in response to receiving the information describing the smart contract, operations to update the second distributed ledger; and interpreting, by at least one of the second plurality of computing devices, the information describing the smart contract to determine and perform at least one of a plurality of second smart contract operations on the second consensus network.

In another example, this disclosure describes a system comprising a first consensus network that stores information in a first distributed ledger, wherein the first consensus network includes a first plurality of computing devices including a first computing device, and wherein the first computing device is configured to: receive information describing a smart contract, perform operations to update the first distributed ledger; and interpret the information describing the smart contract to determine and perform at least one of a plurality of first smart contract operations on the first consensus network; and a second consensus network that stores information in a second distributed ledger, wherein the second consensus network includes a second plurality of computing devices including a second computing device, and wherein the second computing device is configured to: receive information describing the smart contract, perform operations to update the second distributed ledger, and interpret the information describing the smart contract to determine and perform at least one of a plurality of second smart contract operations on the second consensus network.

In another example, this disclosure describes a method comprising: receiving, by a computing system, information describing a smart contract; interpreting, by the computing system, the information describing the smart contract to determine a plurality of first smart contract operations to implement the smart contract on a first distributed ledger maintained by a first consensus network and a plurality of second smart contract operations to implement the smart contract on a second distributed ledger maintained by a second consensus network; performing, by the computing system, operations to cause the first distributed ledger maintained by the first consensus network to implement the smart contract on the first consensus network; and performing, by the computing system, operations to cause the second distributed ledger maintained by the second consensus network to implement the smart contract on the second consensus network.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative.

FIG. 3A and FIG. 3B are conceptual illustrations of example code listings that may be used to implement a notary application.

DETAILED DESCRIPTION

The numerous blockchain platforms available have different smart contract APIs and languages. In some respects, the different smart contract APIs and languages makes writing blockchain-independent applications difficult. In order to implement a given smart contract on more than one blockchain platform, it may be necessary to write a different smart contract application for each supported blockchain platform. Additionally, even for simple smart contracts, writing a smart contract may require at least a minimum level of programming skill and experience that relatively few possess. Accordingly, a smart contract interpreter that can be used to interpret a cross-platform smart contract template might make development or implementation of some smart contracts accessible to non-programmers. Such an interpreter might also enable a portable smart contract application that can be moved from one blockchain platform to another in a simplified process that does not require writing any new code. In some examples, a different interpreter is developed for each of a number of different blockchain platforms, and each is used to interpret a template that describes attributes, actions, and/or aspects of the desired smart contract. The template may be a simple description of the smart contract, and may be expressed in more than one form. In some examples, the template may be expressed using a descriptive language that is not Turing-complete.

Figure 1:
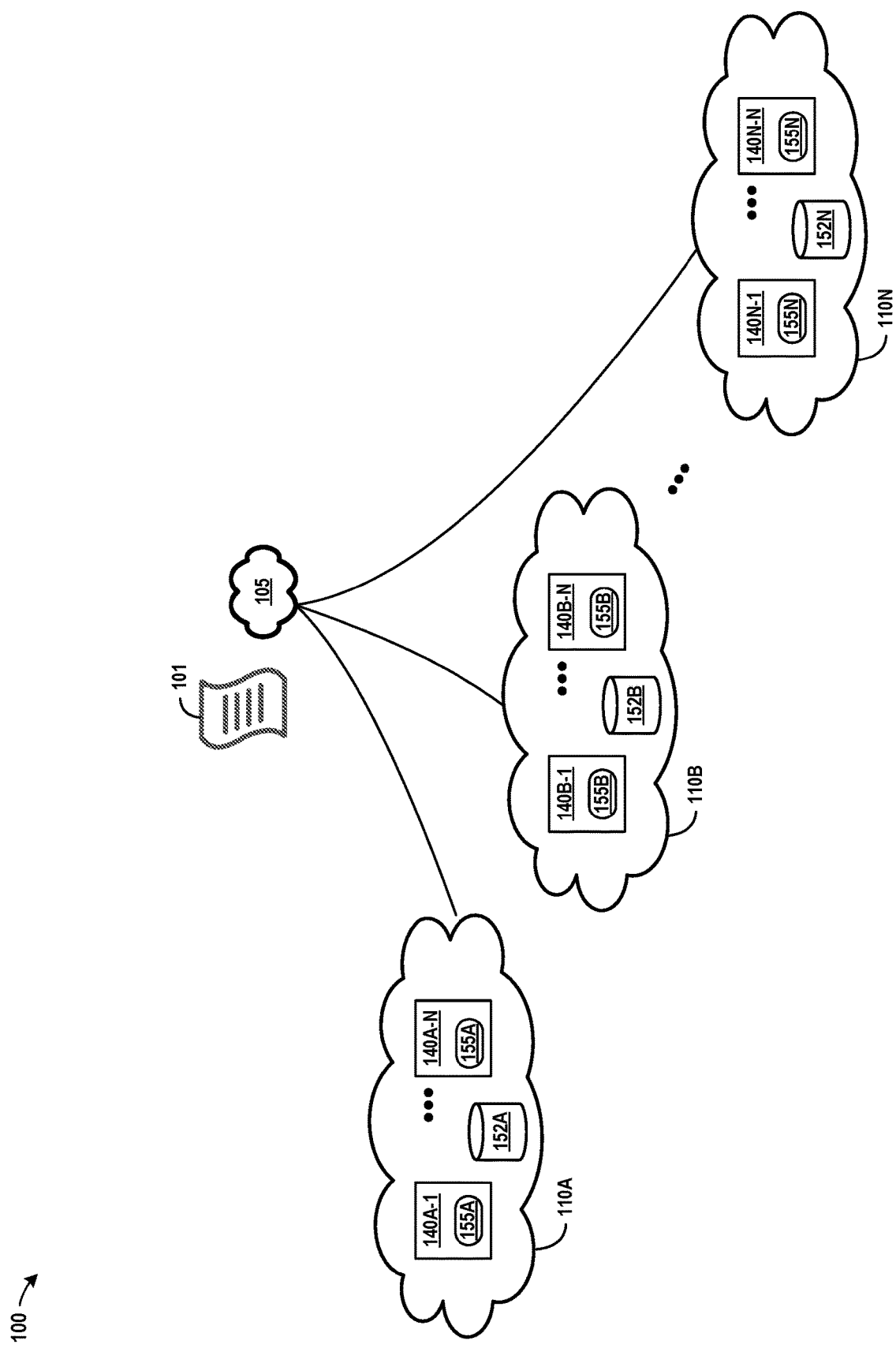
FIG. 1 is a conceptual diagram illustrating a system in which a description of a smart contract is interpreted by one or more nodes of multiple consensus networks, in accordance with one or more aspects of the present disclosure.

FIG. 1 is a conceptual diagram illustrating a system in which a description of a smart contract is interpreted by one or more nodes of multiple consensus networks, in accordance with one or more aspects of the present disclosure. In the example of FIG. 1, system 100 includes multiple consensus networks, including consensus network 110A through consensus network 110N (collectively "consensus networks 110") connected through network 105. Each of consensus networks 110 include a plurality of nodes. For instance, consensus network 110A includes nodes 140A-1 through 140A-N (collectively "nodes 140A"), which may represent any number of nodes. Similarly, consensus network 110B includes nodes 140B-1 through 140B-N (collectively "nodes 140B"), representing any number of nodes, and in general, consensus network 110N includes nodes 140N-1 through node 140N-N (collectively "nodes 140N"), again representing any number of nodes.

Each of consensus networks 110 included within FIG. 1 includes one or more distributed ledgers. In the example shown, consensus network 110A includes a blockchain or distributed ledger 152A, which may be implemented as a data store included in multiple (or all) nodes 140A within consensus network 110A. Consensus network 110B through consensus network 110N may be implemented in a similar manner, so that each of consensus networks 110 includes one or more distributed ledgers 152 (e.g., consensus network 110B includes distributed ledger 152B and consensus network 110N includes distributed ledger 152N). In general, each node within a consensus network (or a significant fraction of the nodes) includes a copy (or at least a partial copy) of the distributed ledgers maintained by the consensus network.

Each of consensus networks 110 is a network of computing devices (e.g., "nodes 140") that implement one or more distributed ledgers 152. Nodes 140 included within each of consensus networks 110 may represent any computing device capable of adhering to a consensus protocol and/or performing operations corresponding to one or more smart contract modules 155 (e.g., a module that executes source code associated with smart contract modules 155). One or more of consensus networks 110 may, for instance, represent an Ethereum network of Ethereum virtual machines (EVMs), also known as an Ethereum blockchain platform, executing on hardware computing devices.

Each of distributed ledgers 152 (i.e., included within each of consensus networks 110) may be shared transactional databases or data stores that include a plurality of blocks, each block (other than the root) referencing at least one block created at an earlier time, each block bundling one or more transactions registered within distributed ledgers 152, and each block cryptographically secured. Each of consensus networks 110 may receive transactions from transaction senders (e.g., computing devices external or internal to each of consensus networks 110) that invoke functionality of distributed ledgers 152 (or of smart contract modules 155) to modify a given distributed ledger 152 stored within a consensus network. Each of consensus networks 110 uses the distributed ledger 152 stored within the consensus network for verification. Each block of a distributed ledger typically contains a hash pointer as a link to a previous block, a timestamp, and the transaction data for the transactions. By design, distributed ledgers 152 are inherently resistant to modification of previously-stored transaction data. Functionally, each of distributed ledgers 152 serves as a ledger, distributed across many nodes of a consensus network, that can record transactions between parties efficiently and in a verifiable and permanent way.

Each of consensus networks 110 may be a peer-to-peer network that manages one or more distributed ledgers 152 by collectively adhering to a protocol for validating new blocks. Once recorded, the data in any given block of distributed ledgers 152 cannot be altered retroactively without the alteration of all subsequent blocks and a collusion of at least some (e.g., typically a majority) of nodes 140 of the particular consensus network. For instance, with reference to consensus network 110A, the data in a block within distributed ledger 152A cannot be altered retroactively without also altering all subsequent blocks and without agreement of a majority of nodes 140A of consensus network 110A.

Within each of consensus networks 110, and for simplicity, one distributed ledger 152 is illustrated, but multiple distributed ledgers 152 might be included or implemented by each of consensus networks 110 in a manner consistent with the techniques described herein. For example, consensus network 110A may manage multiple distributed ledgers 152A. Further, each of distributed ledgers 152A might be a private distributed ledger or a public distributed ledger.

Each of smart contract modules 155 (e.g., smart contract modules 155A within nodes 140A of consensus network 110A) may represent a so-called "smart contract." For instance, each of smart contract modules 155A may represent an executable script or program for performing a transaction for a party, or between parties, to modify state of distributed ledgers 152A. In examples of consensus networks that are Ethereum networks, smart contract module 155A may represent one or more autonomous scripts or one or more stateful decentralized applications that are stored in an Ethereum distributed ledger 152A for later execution by the nodes of consensus network 110A. Smart contract module 155A may reside in one or more blocks of distributed ledgers 152A, and may be considered part of one or more distributed ledgers 152A. In examples described herein, one or more of smart contract modules 155 may be based on or operate in accordance with template 101, including in one or more ways described herein.

Since ledger 152A is a distributed ledger, each of nodes 140A within consensus network 110A (or at least a significant fraction of nodes 140A) store a copy of distributed ledger 152A. Accordingly, each of nodes 140A includes a copy of smart contract module 155A, and smart contract module 155A shown in FIG. 1 as included within each of nodes 140A is therefore an identical copy of the data, script, and/or code implementing a smart contract.

Similarly, each of nodes 140B that stores a copy of distributed ledger 152B includes a copy of smart contract module 155B that is part of distributed ledger 152B. And in general, each of nodes 140N stores a copy of distributed ledger 152N, and includes a copy of any smart contract (e.g., smart contract module 155N) that is stored within distributed ledger 152N.

For ease of illustration, a limited number of consensus networks 110, nodes 140, distributed ledgers 152, networks 105, and templates 101 are shown within FIG. 1 and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

In accordance with one or more aspects of the present disclosure, consensus network 110A may implement a smart contract based on template 101. For instance, in an example that can be described with reference to FIG. 1, node 140A-1 receives, over consensus network 110A (e.g., from network 105), template 101. Smart contract module 155A within node 140A-1 analyzes template 101 and determines that template 101 includes instructions for implementing a smart contract on a consensus network. Smart contract module 155A stores template 101 or information derived from template 101.

Node 140A-1 also communicates with at least some of nodes 140A within consensus network 110A pursuant to a consensus protocol, and causes (or initiates a process that causes) each of smart contract modules 155A within each of nodes 140A to update a distributed ledger maintained by nodes 140A within network 110A to include template 101 or information derived from template 101 within the distributed ledger. Once some or all of nodes 140A determine that the updates to the distributed ledger are valid, template 101 (or information describing a smart contract based on template 101) is included within distributed ledger 152A maintained by consensus network 110A. Accordingly, smart contract module 155A executes across nodes 140A within consensus network 110A, and in response to transaction requests, smart contract module 155A thereafter modifies distributed ledger 152A maintained within consensus network 110A in the manner specified by the smart contract defined by template 101.

Consensus network 110B may also implement a smart contract based on the same template 101. For instance, referring again to the example of FIG. 1, one or more of nodes 140B receive, over consensus network 110B, template 101. For example, smart contract module 155B executing on node 140B-1 receives template 101 and determines that template 101 includes instructions for implementing a smart contract on consensus network 110B. Smart contract module 155B communicates with at least some of nodes 140B within consensus network 110B pursuant to a consensus protocol, and causes (or initiates a process that causes) each of smart contract modules 155B within each of nodes 140B to update distributed ledger 152B to include template 101 (or information derived from template 101). Thereafter, smart contract module 155B executes across nodes 140B within consensus network 110B, and in response to transaction requests, smart contract module modifies distributed ledger 152B within consensus network 110B in the manner specified by the smart contract defined by template 101.

Even if smart contract modules 155A and 155B are implementing the same smart contract, smart contract module 155B may operate differently than smart contract module 155A included within nodes 140A of consensus network 110A because consensus network 110B may be based on different consensus protocols, blockchain technologies, application programming interfaces, programming requirements or languages, or other implementation details. However, in accordance with one or more aspects of the present disclosure, smart contract module 155B is designed to interpret template 101 and implement a smart contract consistent with the requirements and provisions of template 101 on consensus network 110B using the appropriate protocols, languages, APIs, and other features of consensus network 110B. Accordingly, smart contract module 155B of node 140B-1 may implement a smart contract, based on template 101, and update distributed ledger 152B within consensus network 110B in the manner specified by template 101.

In general, one or more consensus networks 110 may also implement a smart contract based on the same template 101. A smart contract corresponding to template 101 may be implemented on any number of diverse consensus networks, where each consensus network includes nodes having a smart contract module (e.g., smart contract module 155A or 155B) capable of interpreting template 101 in a manner appropriate for the consensus network that the smart contract module is associated with. Once a smart contract module interprets template 101 for a given consensus network, the smart contract module thereafter carries out the provisions of the smart contract in the manner specified by template 101. Therefore, in general, one or more smart contract modules 155N executing within each of nodes 140N of consensus network 110N may interpret template 101 and execute on and/or configure consensus network 110N to implement the smart contract so that it thereafter modifies the distributed ledger maintained by consensus network 110 pursuant to the provisions and/or requirements of the smart contract.

Through techniques in accordance with one or more aspects of the present disclosure, such as by interpreting smart contract descriptions or templates for use as smart contracts executing on multiple, diverse blockchain platforms, system 100 may simplify development of smart contracts and ensure more consistent implementation of smart contracts developed for multiple consensus networks or blockchains themselves having diverse implementations. By simplifying development and ensuring more consistent implementation, system 100 may enable more accurate and more reliable (e.g., bug-free) processing of smart contract rules because development of smart contracts for different platforms will be easier and less prone to errors, since much of the logic can be automated or implemented by the smart contract itself based on simple rules outlined in the template. Therefore, aspects of this disclosure may improve the function of system 100 because interpreting smart contracts descriptions in a manner consistent with this disclosure may have the effect of causing system 100 to perform more accurate and reliable processing.

Further, by enabling the smart contract to interpret a limited set of rules and generate a smart contract based on those rules, fewer processing cycles may be consumed developing smart contracts, thereby causing less electrical power to consumed, because processing cycles used during development of smart contracts consume electrical power. Therefore, aspects of this disclosure may also improve the function of system 100 because interpreting smart contracts descriptions in a manner consistent with this disclosure may have the effect of causing system 100 to consume less electrical power.

Figure 2:
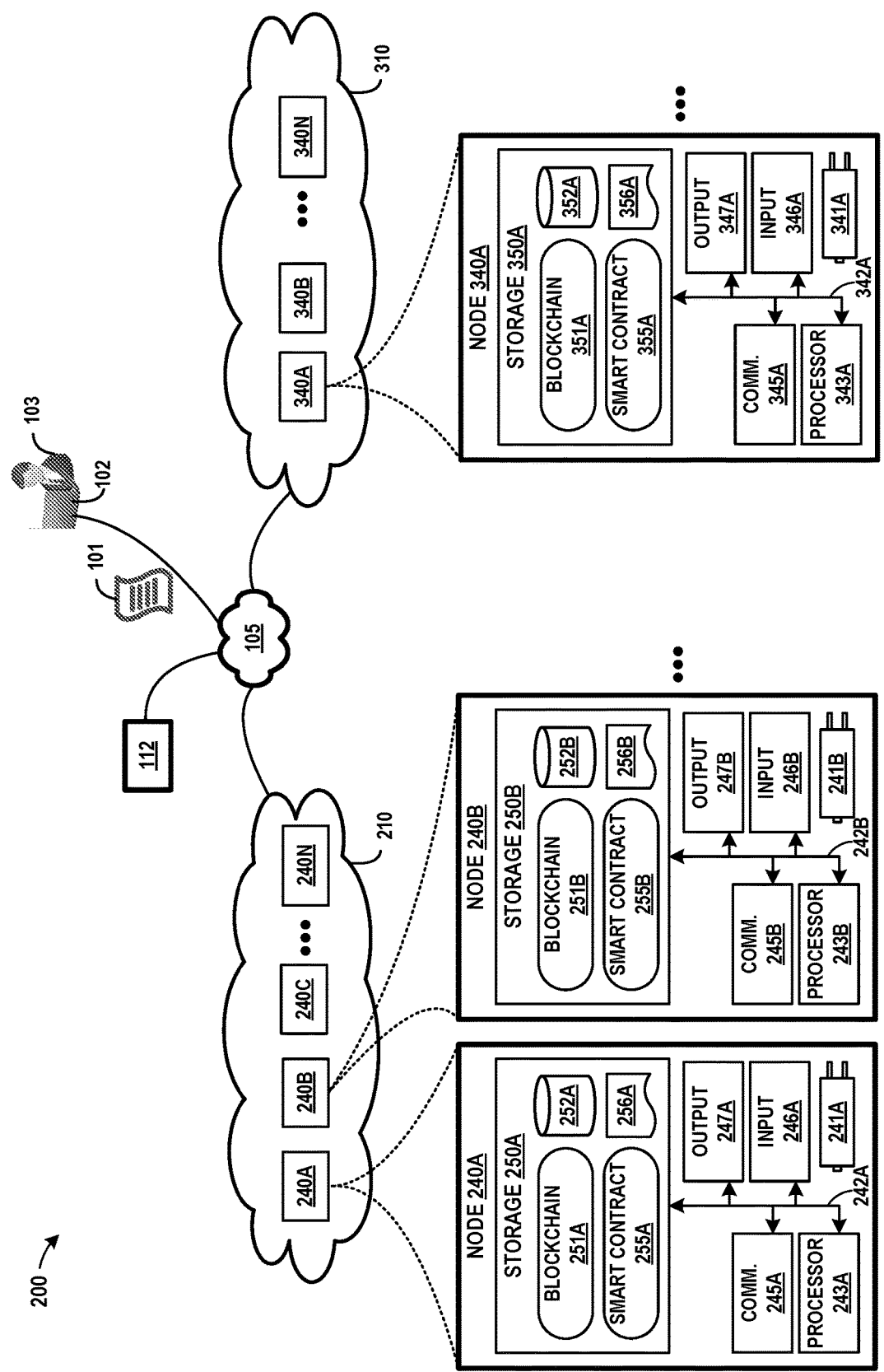
FIG. 2 is a block diagram illustrating an example system in which multiple consensus networks are executing a smart contract based on a template, in accordance with one or more aspects of the present disclosure.

FIG. 2 is a block diagram illustrating an example system in which multiple consensus networks are executing a smart contract based on a template, in accordance with one or more aspects of the present disclosure. System 200 of FIG. 2 may be described as an example or alternative implementation of system 100 of FIG. 1. One or more aspects of FIG. 2 may be described herein within the context of FIG. 1.

In the example of FIG. 2, system 200 includes consensus network 210, consensus network 310, and client device 102 all connected through network 105. Client device 102 may be operated by user 103. Client device 102 may generate template 101 based on input from user 103. Each of consensus network 210 and consensus network 310 may generally correspond to one or more of consensus networks 110 of FIG. 1. For ease of illustration, consensus networks 210 and 310 are illustrated in FIG. 2, although techniques in accordance with one or more aspects of the present disclosure may be performed with many more consensus networks.

Also, each of nodes 240A through 240N (collectively "nodes 240") shown within consensus network 210 and each of nodes 340A through 340N (collectively "nodes 340") shown within consensus network 310 of FIG. 2 may generally correspond to nodes 140 included within consensus networks 110 of FIG. 1. These devices, systems, and/or components may be implemented in a manner consistent with the description of the corresponding system provided in connection with FIG. 1, although in some examples, such systems may involve alternative implementations with more, fewer, and/or different capabilities. In general, systems, devices, components, and other items illustrated in FIG. 2 may correspond to like-numbered systems, devices, components, and items illustrated in FIG. 1, and may be described in a manner consistent with the description provided in connection with FIG. 1.

One or more computing systems 112 may, in some examples, serve as a smart contract interpreter that might not be part of any of consensus networks 210 or 310, but that interprets template 101 and provides services in the manner described herein. Computing system 112 may also, when providing such services, interact with consensus networks 210 and/or 310 to instantiate and/or configure smart contracts stored within a distributed network on such consensus networks. Computing system 112 be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 112 may represent a cloud computing system, server farm, and/or server cluster (or portion thereof) that provides services to client devices and other devices or systems. In other examples, computing system 112 may represent or be implemented through one or more virtualized compute instances (e.g., virtual machines, containers) of a data center, cloud computing system, server farm, and/or server cluster.

Any or all of network 105, consensus network 210, and/or consensus network 310 may be the interne or may include, be a part of, and/or represent any public or private communications network or other network. For instance, network 105, consensus network 210, or consensus network 310 may each be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across the networks illustrated in FIG. 2 using any suitable communication techniques. Network 105, consensus network 210, and/or consensus network 310 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to the networks shown in FIG. 2 using one or more network links. The links coupling such devices or systems may be Ethernet or other types of network connections, and such connections may be wireless and/or wired connections. One or more of the devices or systems illustrated in FIG. 2 or otherwise on network 105, consensus network 210, and/or consensus network 310 may be in a remote location relative to one or more other illustrated devices or systems.

Client device 102 may be implemented as any suitable client computing system, such as a mobile, non-mobile, wearable, and/or non-wearable computing device. Client device 102 may represent a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure.

Each of nodes 240A through 240N (shown within consensus network 210) and each of nodes 340A through 340N (shown within consensus network 310) may be implemented as any suitable computing system, such as one or more server computers, workstations, mainframes, appliances, cloud computing systems, and/or other computing systems that may be capable of performing operations and/or functions described in accordance with one or more aspects of the present disclosure. As with computing system 112, one or more of nodes 240 and/or nodes 340 may, in some examples, represent a cloud computing system, server farm, and/or server cluster (or portion thereof) that provides services to client devices and other devices or systems. In other examples, nodes 240 and nodes 340 may represent or be implemented through one or more virtualized compute instances (e.g., virtual machines, containers) of a data center, cloud computing system, server farm, and/or server cluster. For instance, any or all of nodes 240 or nodes 340 may be implemented as Ethereum virtual machines.

In the example of FIG. 2, node 240A, for example, may include power source 241A, one or more processors 243A, one or more communication units 245A, one or more input devices 246A, one or more output devices 247A, and one or more storage devices 250A. Storage devices 250A may include blockchain module 251A, ledger data store 252A, smart contract module 255A, and template data 256A. One or more of the devices, modules, storage areas, or other components of node 240A may be interconnected to enable inter-component communications (physically, communicatively, and/or operatively). In some examples, such connectivity may be provided by through communication channels (e.g., communication channels 242A), a system bus, a network connection, an inter-process communication data structure, or any other method for communicating data.

Similarly, node 240B may include power source 241B, one or more processors 243B, one or more communication units 245B, one or more input devices 246B, one or more output devices 247B, and one or more storage devices 250B. Storage devices 250B may include blockchain module 251B, ledger data store 252B, smart contract module 255B, and template data 256B. As in node 240A, one or more of the devices, modules, storage areas, or other components of node 240B may be interconnected to enable inter-component communications (physically, communicatively, and/or operatively). Also as in node 240A, such connectivity may be provided by through a system bus (e.g., communication channels 242B), a network connection, an inter-process communication data structure, or any other method for communicating data. In general, any given "node 240N" may include components that correspond to those illustrated with respect to node 240B and node 240B.

Similarly, also in the example of FIG. 2, node 340A may include power source 341A, one or more processors 343A, one or more communication units 345A, one or more input devices 346A, one or more output devices 347A, and one or more storage devices 350A. Nodes 340A may include blockchain module 351A, ledger data store 352A, smart contract module 355A, and template data 356A. And in general, any given "node 340N" may include components that correspond to those illustrated with respect to node 340A.

In this disclosure, processors 243A through 243N and processors 343A through 343N may be collectively referred to as "processors 243" or "processors 343." Communication units 245A through 245N and communication units 345A through 345N may be collectively referred to as "communication units 245" and "communication units 345," respectively. As used herein generally, "N" is any number such that "processors 243" represents any number of processors 243 and "communication units 245" represents any number of communication units 245. Correspondingly, for other components, devices, or modules that are illustrated or described using a similar numbering and letter convention, such components, devices, or modules may be referred to collectively in a similar fashion. In some examples, and as may be noted, one or more nodes 240 may include more or fewer capabilities, features, components, and/or functionality than other nodes 240. For certain nodes 240, one or more components, devices, or modules shown in FIG. 2 as being included within one or more nodes 240 may be optional. For instance, although each of nodes 240 is shown with ledger data stores 252 in FIG. 2, in some examples one or more of nodes 240 might not include ledger data store 252, or might include a partial copy of ledger data store 252.

Certain aspects of nodes 240 are described below with respect to node 240A. Other nodes 240 (e.g., node 240B through node 240N) and nodes 340 (shown within consensus network 310) may be described similarly, and may also include the same, similar, or corresponding components, devices, modules, functionality, and/or other features. Descriptions herein with respect to node 240A may therefore correspondingly apply to one or more other nodes 240 (e.g., node 240B through node 240N). For example, the description of processor 243A of node 240A may also apply to processor 243B of node 240B. Further, such descriptions may apply also to nodes 340 (e.g., node 340A through node 340N), and specifically to illustrated node 340A, which also includes similarly-numbered components corresponding to both node 240A and node 240B. Accordingly, the description of processor 243A of node 240A may also correspondingly apply to processor 343A of node 340A. Further, in some examples, computing system 112 may be implemented as a computing system that is not included within consensus networks 210 or 310 but that is nevertheless similar to nodes 240 and/or 340. Accordingly, descriptions herein with respect to node 240A may also apply to computing system 112, to the extent that computing system 112 is implemented as a computing system having at least some attributes similar to nodes 240 and 340.

Power source 241A of node 240A may provide power to one or more components of node 240A. Power source 241A may receive power from the primary alternating current (AC) power supply in a building, home, or other location. In other examples, power source 241A may be a battery or a device that supplies direct current (DC). In still further examples, node 240A and/or power source 241A may receive power from another source. One or more of the devices or components illustrated within node 240A may be connected to power source 241A, and/or may receive power from power source 241A. Power source 241A may have intelligent power management or consumption capabilities, and such features may be controlled, accessed, or adjusted by one or more modules of node 240A and/or by one or more processors 243A to intelligently consume, allocate, supply, or otherwise manage power.

One or more processors 243A of node 240A may implement functionality and/or execute instructions associated with node 240A or associated with one or more modules illustrated herein and/or described below. One or more processors 243A may be, may be part of, and/or may include processing circuitry that performs operations in accordance with one or more aspects of the present disclosure. Examples of processors 243A include microprocessors, application processors, display controllers, auxiliary processors, one or more sensor hubs, and any other hardware configured to function as a processor, a processing unit, or a processing device. Node 240A may use one or more processors 243A to perform operations in accordance with one or more aspects of the present disclosure using software, hardware, firmware, or a mixture of hardware, software, and firmware residing in and/or executing at node 240A.

One or more communication units 245A of node 240A may communicate with devices external to node 240A by transmitting and/or receiving data, and may operate, in some respects, as both an input device and an output device. In some examples, communication unit 245A may communicate with other devices over a network. In other examples, communication units 245A may send and/or receive radio signals on a radio network such as a cellular radio network. In other examples, communication units 245A of node 240A may transmit and/or receive satellite signals on a satellite network such as a Global Positioning System (GPS) network. Examples of communication units 245A include a network interface card (e.g. such as an Ethernet card), an optical transceiver, a radio frequency transceiver, a GPS receiver, or any other type of device that can send and/or receive information. Other examples of communication units 245A may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246A may represent any input devices of node 240A not otherwise separately described herein. One or more input devices 246A may generate, receive, and/or process input from any type of device capable of detecting input from a human or machine. For example, one or more input devices 246A may generate, receive, and/or process input in the form of electrical, physical, audio, image, and/or visual input (e.g., peripheral device, keyboard, microphone, camera).

One or more output devices 247A may represent any output devices of node 240A not otherwise separately described herein. One or more output devices 247A may generate, receive, and/or process input from any type of device capable of detecting input from a human or machine. For example, one or more output devices 247A may generate, receive, and/or process output in the form of electrical and/or physical output (e.g., peripheral device, actuator).

One or more storage devices 250A within node 240A may store information for processing during operation of node 240A. Storage devices 250A may store program instructions and/or data associated with one or more of the modules described in accordance with one or more aspects of this disclosure. One or more processors 243A and one or more storage devices 250A may provide an operating environment or platform for such modules, which may be implemented as software, but may in some examples include any combination of hardware, firmware, and software. One or more processors 243A may execute instructions and one or more storage devices 250A may store instructions and/or data of one or more modules. The combination of processors 243A and storage devices 250A may retrieve, store, and/or execute the instructions and/or data of one or more applications, modules, or software. Processors 243A and/or storage devices 250A may also be operably coupled to one or more other software and/or hardware components, including, but not limited to, one or more of the components of node 240A and/or one or more devices or systems illustrated as being connected to node 240A.

In some examples, one or more storage devices 250A are temporary memories, meaning that a primary purpose of the one or more storage devices is not long-term storage. Storage devices 250A of node 240A may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250A, in some examples, also include one or more computer-readable storage media. Storage devices 250A may be configured to store larger amounts of information than volatile memory. Storage devices 250A may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Blockchain module 251A may perform functions relating to adhering to protocols and/or procedures of a consensus network. Blockchain module 251A may cause communication unit 245A to communicate with one or more nodes 240 within consensus network 210 pursuant to a consensus algorithm or blockchain protocol to cause other nodes 240 to update a distributed ledger maintained by a plurality of nodes 240 within consensus network 210. Blockchain module 251A may update its own ledger data store 252A, and verify that ledger data store 252A is consistent with other ledger data stores 252 included across consensus network 210. Blockchain module 251A may output information to smart contract module 255A. Blockchain module 251A may follow a consensus protocol to verify the validity of the instructions to modify ledger data store 252A. Blockchain module 251A may implement one or more blockchain services of a distributed computing platform. Blockchain module 251 may, for example, implement services of an Ethereum computing platform or one or more Hyperledger-based blockchains or related tools. Although blockchain module 251A may be described in connection with FIG. 2 as primarily performing operations relating to consensus networks, blockchain module 251A may alternatively, or in addition, perform other operations. In some examples, functions performed by blockchain module 251A could be performed by software or by a hardware device executing software. In other examples, functions performed by blockchain module 251A may be implemented primarily or partially through hardware.

Ledger data store 252A may represent any suitable data structure or storage medium for storing information in a distributed ledger shared or commonly maintained across consensus network 210. The information stored in ledger data store 252A may be searchable and/or categorized such that one or more modules within node 240A may provide an input requesting information from ledger data store 252A, and in response to the input, receive information stored within ledger data store 252A. Each of nodes 240 within consensus network 210 may collectively maintain ledger data stores 252 included within nodes 240, and thereby maintain a distributed ledger (made up of ledger data stores 252 stored across nodes 240 of consensus network 210) according to consensus network or blockchain protocols used within consensus network 210. Ledger data store 252A may be primarily maintained by blockchain module 251A. Ledger data store 252A may provide other modules with access to the data stored within ledger data store 252A, and/or may analyze the data stored within ledger data store 252A and output such information on behalf of other modules of node 240A.

Smart contract module 255A may perform functions relating to interpreting platform-independent information about a smart contract (e.g., a template) and perform operations consistent with carrying out the provisions or terms of the smart contract specified by the template. Smart contract module 255A may store information about a smart contract as template data 256A. Smart contract module 255A may interpret and/or analyze template data 256A and identify one or more operations that are to be performed by smart contract module 255A when executing a smart contract corresponding to template data 256A and/or template 101. Smart contract module 255A may implement a smart contract based on template data 256A (or template 101), even if the information in template data 256A and/or template 101 is not Turing-complete. Smart contract module 255A may receive information from and output information to one or more other modules, and may otherwise interact with and/or operate in conjunction with one or more other modules of node 240A. Although smart contract module 255A may be described in connection with FIG. 2 as primarily performing interpretation-related operations, and then enforcing provisions of a smart contract, smart contract module 255A may alternatively, or in addition, perform other operations.

Template data 256A may include information derived from information received in communications with client device 102. Template data 256A may be derived from information received (e.g., template 101) over network 105 from client device 102. Smart contract module 255A of node 240A may store information about template 101 as template data 256A. In some examples, template data 256A may be stored as part of ledger data store 252A.

In the example of FIG. 2, and in accordance with one or more aspects of the present disclosure, one or more of nodes 240 may receive template 101. For instance, in an example that can be described in connection with FIG. 2, client device 102 (operated by user 103) detects input that it determines corresponds to information describing attributes of a smart contract. Client device 102 stores the information describing attributes of the smart contract. Client device 102 outputs, over network 105, template 101, which is same as or is derived from the information describing attributes of the smart contract. Network 105 communicates template 101 over consensus network 210. Communication unit 245A of node 240A detects a signal over consensus network 210. Communication unit 245A outputs an indication of the signal to smart contract module 255A. Smart contract module 255A determines that the signal corresponds to template 101. Smart contract module 255A stores template 101 as template data 256A.

One or more of nodes 240 may update a distributed ledger maintained by consensus network 210 or nodes 240 within consensus network 210. For instance, still referring to FIG. 2, blockchain module 251A receives information about template 101 from smart contract 255A. Blockchain module causes communication unit 245A to output a signal over consensus network 210. Each of the nodes (or a significant fraction of nodes 240) within consensus network 210 detect a signal over consensus network 210. In one example, communication unit 245B of node 240B detects a signal over consensus network 210. Communication unit 245B outputs an indication of the signal to blockchain module 251B. Blockchain module 251B determines that the signal includes instructions to modify ledger data store 252B to include template 101 or information derived from template 101. Blockchain module 251B may store template as template data 256A.

Blockchain module 251B of node 240B follows a consensus protocol to verify the validity of the proposed modification to ledger data store 252B received over consensus network 210. Similarly, other nodes 240 within consensus network 210 (e.g., node 240C to node 240N) may also follow the consensus protocol associated with consensus network 210 to verify the validity of the proposed modification, received from one or more other nodes 240 within consensus network 210, to update the each respective ledger data store 252 to include template 101 or information derived from template 101. Eventually, each of nodes 240 (or a majority of nodes 240) within consensus network 210 determine that any proposed modifications to each of the ledger data stores 252 (which collectively correspond to a distributed ledger on consensus network 210) can be verified and are a valid part of each of ledger data stores 252.

One or more of nodes 240 may interpret template 101. For instance, in FIG. 2, smart contract module 255A of node 240A, which may be stored within or part of ledger data store 252A, interprets and/or analyzes template data 256A and identifies one or more operations that are to be performed by smart contract module 255A when executing a smart contract corresponding to template data 256A and/or template 101.

Smart contract module 255A of node 240A may perform transactions specified by template 101. For example, smart contract module 255A may output information to blockchain module 251A, and blockchain module 251A may determine that the information includes instructions to modify ledger data store 252A to enforce a smart contract corresponding to template data 256A. Blockchain module 251A may update ledger data store 252A in accordance with requirements specified by template 101.

One or more of nodes 240 may update a distributed ledger maintained by consensus network 210 or nodes 240 within consensus network 210 as a result of a transaction performed pursuant to template 101. For instance, still referring to FIG. 2, blockchain module 251A causes communication unit 245A to output a signal over consensus network 210. Each of the nodes (or a significant fraction of nodes 240) within consensus network 210 detect a signal over consensus network 210. In one example, communication unit 245B of node 240B detects a signal over consensus network 210. Communication unit 245B outputs an indication of the signal to blockchain module 251B. Blockchain module 251B determines that the signal includes instructions to modify ledger data store 252B in the manner specified by the instructions. In some examples, the instructions are based on operations performed pursuant to template 101 or template data 256A from node 240A. Alternatively or in addition, the instructions include or are derived from the information stored within ledger data store 252A stored at node 240A (e.g., the smart contract as implemented by smart contract module 255A of node 240A).

Blockchain module 251B of node 240B follows a consensus protocol to verify the validity of the instructions to modify ledger data store 252B received over consensus network 210. Similarly, other nodes 240 within consensus network 210 (e.g., node 240C to node 240N) may also follow the consensus protocol associated with consensus network 210 to verify the validity of instructions, received from one or more other nodes 240 within consensus network 210, to update the state of each respective smart contract module 255 (which may involve modifying each respective ledger data store 252) to perform transactions specified by template 101. Eventually, each of nodes 240 (or a majority of nodes 240) within consensus network 210 determine that any proposed modifications to each of the ledger data stores 252 (which collectively correspond to a distributed ledger on consensus network 210) can be verified and are a valid part of each of ledger data stores 252.

In some examples, user 103 may seek to deploy the same or a corresponding smart contract with the same provisions to a different consensus network. User 103 may, for example, determine (e.g., for business, personal, marketing, or other reasons) that implementation of the smart contract on consensus network 310 might be more appropriate than on consensus network 210. Or, user 103 may determine that the smart contract should be implemented on both consensus network 210 and consensus network 310. In general, it may be appropriate or desirable to implement a given smart contract on any of a number of a diverse array of consensus networks. Yet in such a scenario, such other consensus networks (e.g., consensus network 310) might involve different blockchain protocols or consensus protocols, or may be architected with implementation details that differ in some respects from those of consensus network 210. Accordingly, the manner in which the smart contract was implemented by each of nodes 240 in consensus network 210 might not work in consensus network 310.

However, in accordance with one or more aspects of the present disclosure, template 101 may be provided to one or more nodes within a different consensus network, and a smart contract executing on such a node may reinterpret template 101 so that the same smart contract represented by template 101 may also execute on a different consensus network. In other words, in one example, one or more nodes 340 on consensus network 310 may receive template 101, and a smart contract executing on such nodes 340 may reinterpret template 101 so that the same smart contract represented by template 101 may also execute on consensus network 310. In some examples, when the smart contract executes or starts executing on consensus network 310, the smart contract previously described as executing on consensus network 210 may terminate and/or cease operating in favor of the smart contract executing on consensus network 310. In other examples, the smart contract executing on consensus network 210 may continue to operate for a period of time or indefinitely, and may execute concurrently, simultaneously, and/or in parallel with the smart contract executing on consensus network 310.

For instance, continuing with the example being described in connection with FIG. 2, client device 102 outputs, over network 105, template 101. Communication unit 345A of node 340A detects a signal over network 105. Communication unit 345A outputs an indication of the signal to smart contract module 355A. Smart contract module 355A determines that the signal corresponds to template 101. Smart contract module 355A stores information about template 101 as template data 356A.

One or more of nodes 340 may update a distributed ledger maintained by consensus network 310 or nodes 340 within consensus network 310. For instance, still referring to FIG. 2, and in the manner described in connection with consensus network 210, nodes 340 within consensus network 310 follow a consensus protocol associated with consensus network 310 to verify the validity of a proposed transaction adding template 101 or information derived from template 101 to the distributed ledger maintained by consensus network 310.

Smart contract module 355A of node 340A may thereafter perform transactions specified by template 101. For instance, when performing a transaction, smart contract module 355A analyzes template data 356A and identifies one or more operations that are to be performed by smart contract module 355A when executing a smart contract corresponding to template data 356A and/or template 101. Smart contract module 355A may perform the transactions, and cause blockchain module 351A to update ledger data store 352A to include information about the transaction.

One or more of nodes 340 may update a distributed ledger maintained by consensus network 310 to include information about the transaction. For instance, in FIG. 2, smart contract module 355A outputs information to blockchain module 351A. Blockchain module 351A causes communication unit 345A to output a signal over consensus network 310. Each of the nodes (or a significant fraction of the nodes) within consensus network 310 detect instructions, over consensus network 310, to update each respective ledger data store 352 included within nodes 340 to match ledger data store 352A. Each of nodes 340 follow a consensus protocol to verify the validity of the instructions. The protocols followed by nodes 340 may be different than those followed by nodes 240 of consensus network 210, but smart contract modules 355 and/or blockchain modules 351 cause nodes 340 to follow an appropriate procedure for consensus network 310 to implement a smart contract corresponding to template 101, just as smart contract modules 255 (or blockchain modules 251) cause nodes 240 to follow an appropriate procedure for consensus network 210 to implement the same or a substantially similar smart contract corresponding to template 101.

Eventually, each of nodes 340 (or a majority of nodes 340) within consensus network 310 determine that the proposed modifications to each instance of ledger data store 352 (which collectively correspond to a distributed ledger on consensus network 310) can be verified.

The smart contract executing on consensus network 210 pursuant to template 101 may continue to execute on nodes 240 within consensus network 210. Accordingly, consensus network 310 may thereafter modify a distributed ledger (made up of ledger data stores 352 stored across nodes 340 of consensus network 310) according to the terms of the smart contract as specified by template 101, and consensus network 210 may also continue to modify a distributed ledger (made up of ledger data stores 252 stored across nodes 240 of consensus network 210) according to the terms of the smart contract.

In some examples, computing system 112 may operate as a smart contract interpreter executing as middleware that interacts with consensus networks 210 and/or 310. For instance, in such an example, computing system 112 may receive template 101 from client device 102 over network 105. Computing system 112 may interact with one or more of consensus networks 210 and 310 to instantiate a smart contract that carries out the requirements of template 101. For example, computing system 112 may interact with one or more nodes 240 of consensus network 210 to modify a distributed ledger maintained by consensus network 210. Such modifications to the distributed ledger may result in a smart contract implementing the specifications of template 101 being included within the distributed ledger. Some or all of nodes 240 may follow a consensus protocol to verify the validity of the proposed modification to each of ledger data stores 252 included within nodes 240. Eventually, each of nodes 240 (or a majority of nodes 240) within consensus network 210 may determine that the proposed modification adding a smart contract that is specified by template 101 is a valid transaction. Consensus network 210 thereafter carries out the terms of the smart contract as defined by template 101. As described herein, computing system 112 may alternatively, or in addition, implement a smart contract specified by template 101 on consensus network 310 without requiring further programming. Modules illustrated in FIG. 2 (e.g., blockchain modules 251, smart contract modules 255) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 3A and FIG. 3B are conceptual illustrations of example code listings that may be used to implement a notary application. FIG. 3A corresponds to a template 390A defining or specifying a smart contract for the notary application, where the template is written in YAML (sometimes described as an acronym for "YAML Ain't Markup Language" or "Yet Another Markup Language"). FIG. 3B also corresponds to a template defining and/or specifying a smart contract for the notary application, except that the template 390B of FIG. 3B is written in JSON (JavaScript Object Notation).

In each of FIG. 3A and FIG. 3B, the illustrated template listing includes two parts: (1) a data model that defines the attributes associated with the notary application executing as a smart contract, and (2) a series of methods that can be called along with the parts of the data model these methods modify, and how the smart contract modifies the parts of the data model. In general, a method is defined as a list of actions in the format "action: destination" As illustrated in FIG. 3A and FIG. 3B, an action can perform one or more of "creates," "modifies," "deletes," "appends," "prepends," "increments," or other actions. The specified destination is the part of the data model to which that the action is applied. The set of actions may be drawn from a descriptive language, for smart contract templates according to techniques described herein, that is not Turing complete.

In some examples, the data model defined in the templates of FIG. 3A and FIG. 3B are dictionaries indexed by a hash, consisting of name, counter, and list of signatures. A signature may be a dictionary consisting of name, date and pgp string. The templates of FIG. 3A and FIG. 3B define two methods: create_doc, and sign_doc. Create_doc will create a new entry in the root dictionary with the supplied data, without modifying existing entries. Sign_doc appends the list of signatures in an existing entry with the supplied signature, then increments the counter (in that order).

One or more nodes 240 may perform smart contract operations specified by the templates of FIG. 3A and/or FIG. 3B. For instance, in an example that can be described with reference to FIG. 3B and also with reference to FIG. 2, client device 102 outputs, over network 105, information about a transaction. Communication unit 245A of node 240A detects a signal over network 105. Communication unit 245A outputs an indication of the signal to blockchain module 251A. Blockchain module 251A determines that the signal corresponds to a "create_doc" action to be executed by a smart contract implementing template 390B. Blockchain module 251A performs the action (or causes smart contract module 255A to perform the action), and thereby modifies distributed ledger 252A to include a dictionary entry consisting of a name, counter, and a list of signatures. Blockchain module 251A causes communication unit 245A to output a signal over consensus network 210. Each of the nodes (or a significant fraction of the nodes) within consensus network 210 detect instructions, over consensus network 210, to update each respective ledger data store 252 included within nodes 240 to match ledger data store 252A. Each of nodes 240 follow a consensus protocol to verify the validity of the instructions. Eventually, each of nodes 240 (or a majority of nodes 240) within consensus network 210 determine that the proposed added dictionary entry can be verified.

Figure 4A:
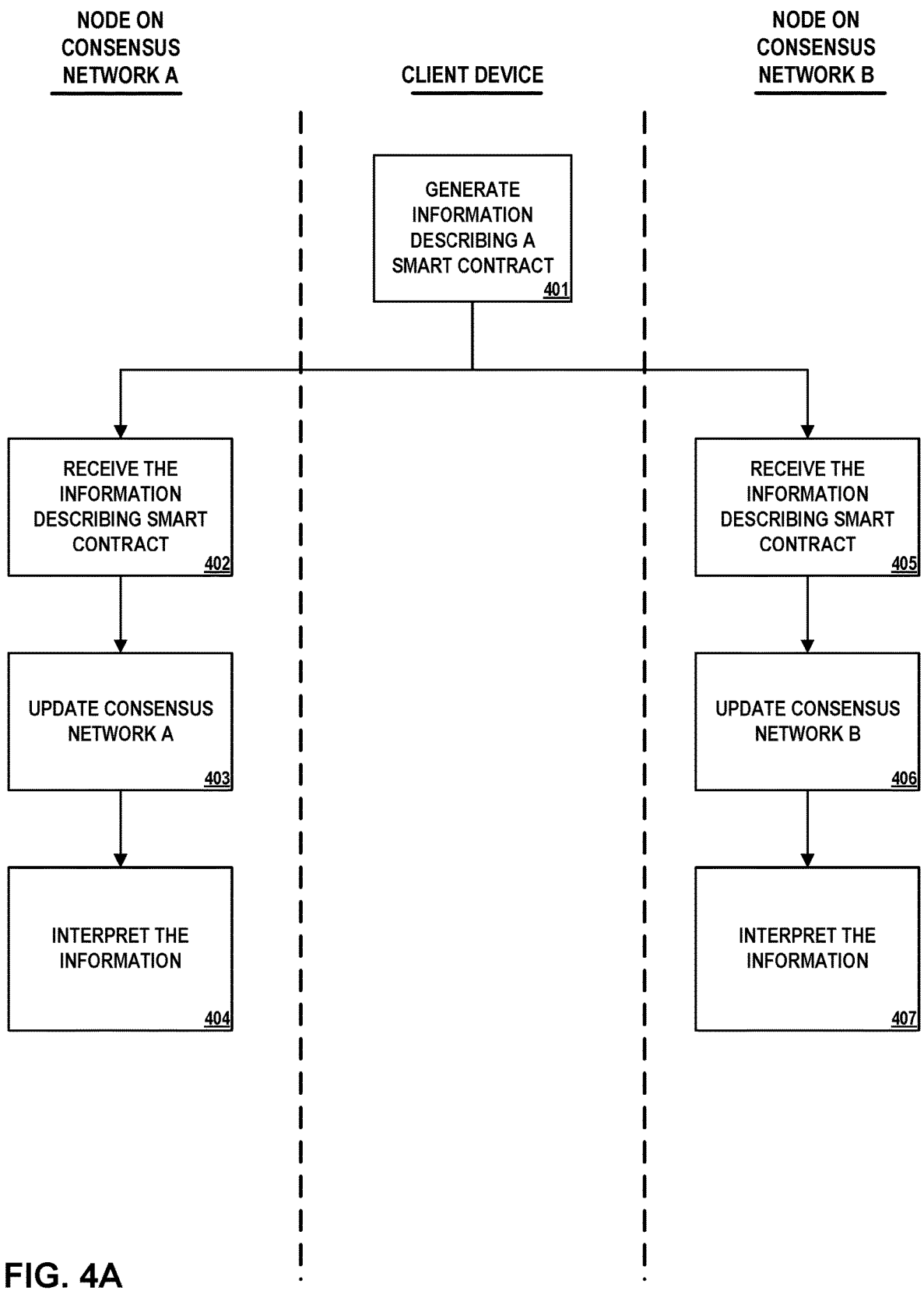
FIG. 4A is a flow diagram illustrating an example process for performing tasks in accordance with one or more aspects of the present disclosure.

FIG. 4A is a flow diagram illustrating an example process for performing tasks in accordance with one or more aspects of the present disclosure. The process of FIG. 4A is illustrated from three different perspectives: operations performed by an example node 240 (left-hand column to the left of dashed line), operations performed by an example client device 102 (middle column between dashed lines), and operations performed by an example node 340 (right-hand column to the right of dashed line). In the example of FIG. 4A, the illustrated process may be performed by system 200 in the context illustrated in FIG. 2. In other examples, different operations may be performed, or operations described in FIG. 4A as being performed by a particular component, module, system, and/or device may be performed by one or more other components, modules, systems, and/or devices. Further, in other examples, operations described in connection with FIG. 4A may be performed in a difference sequence, merged, omitted, or may encompass additional operations not specifically illustrated or described even where such operations are shown performed by more than one component, module, system, and/or device.

In the process illustrated in FIG. 4A, and in accordance with one or more aspects of the present disclosure, client device 102 may generate information describing a smart contract (401). For instance, with reference to FIG. 2, client device 102 (operated by user 103) detects input that it determines corresponds to information describing attributes of a smart contract. Client device 102 stores the information describing attributes of the smart contract.

Node 240A receives, over network 105, information describing a smart contract (402). Client device 102 outputs, over network 105, template 101, which is same as or is derived from the information, stored at client device 102, describing attributes of the smart contract. Network 105 communicates template 101 over consensus network 210. Communication unit 245A of node 240A detects a signal over consensus network 210. Communication unit 245A outputs an indication of the signal to smart contract module 255A. Smart contract module 255A determines that the signal includes information about template 101. Smart contract module 255A stores information about template 101 as template data 256A.

Node 240A updates consensus network 210 to include, within a distributed ledger, information about the template (403). For instance, smart contract module 255A outputs information to blockchain module 251A. Blockchain module 251A determines that the information includes instructions to modify a distributed ledger stored across consensus network 210 to implement a smart contract corresponding to template data 256A. Blockchain module 251A updates ledger data store 252A in a manner consistent with the instructions received from smart contract module 255A. Blockchain module 251A causes communication unit 245A to output a signal over consensus network 210. Each of the nodes (or at least some of the nodes) within consensus network 210 detect a signal over consensus network 210.

In some examples, one such node receiving the signal over consensus network 210 is node 240B. Communication unit 245B of node 240B detects a signal over consensus network 210. Communication unit 245B outputs an indication of the signal to blockchain module 251B. Blockchain module 251B determines that the signal includes instructions to modify ledger data store 252B. Blockchain module 251B further determines that the signal includes information about the smart contract. Blockchain module 251B outputs information to smart contract module 255B, and smart contract module 255B stores information about the smart contract as template data 256B. Blockchain module 251B of node 240B follows a consensus protocol to verify the validity of the instructions to modify ledger data store 252B received over consensus network 210. Similarly, other nodes 240 within consensus network 210 (e.g., node 240C to node 240N) may also follow the consensus protocol associated with consensus network 210 to verify the validity of the instructions to modify their respective ledger data store 252. Eventually, each of nodes 240 (or a majority of nodes 240) within consensus network 210 determine that the proposed modifications to each of instance of ledger data store 252 (which collectively correspond to a distributed ledger on consensus network 210) can be verified.

Node 240A interprets the information describing the smart contract 101 (404). For instance, with reference to FIG. 2, smart contract module 255A analyzes template data 256A (which may be stored within a distributed ledger maintained by consensus network 210) and identifies one or more operations that are to be performed by smart contract module 255A. Smart contract module 255A executes the operations to enforce a smart contract corresponding to template data 256A and/or template 101.

Alternatively, or in addition, user 103 may later seek to deploy a smart contract corresponding to template 101 to consensus network 310. In such an example, consensus network 310 implements a smart contract corresponding to template 101 in a manner similar to how the smart contract was deployed to consensus network 210.

In other words, some or all of nodes 340 of consensus network 310 may receive the information describing the smart contract (405). For instance, still referring to FIG. 2, client device 102 outputs, over network 105, template 101. Node 340A of consensus network 310 detects a signal over network 105. Node 340A determines the signal corresponds to template 101.

Node 340A updates consensus network 310 to include, within a distributed ledger maintained by consensus network 310, information about the template (406). For instance, smart contract module 355A outputs information to blockchain module 351A. Blockchain module 351A determines that the information includes instructions to modify a distributed ledger stored across consensus network 310 to implement a smart contract corresponding to template data 356A. Blockchain module 351A updates ledger data store 352A in a manner consistent with the instructions received from smart contract module 355A. Blockchain module 351A causes communication unit 345A to output a signal over consensus network 310. Each of the nodes (or at least some of the nodes) within consensus network 310 detect a signal over consensus network 310. Each of nodes 340 within consensus network 310 follow the consensus protocol associated with consensus network 310 to verify the validity of the instructions to modify their respective ledger data store 352. Eventually, each of nodes 340 (or a majority of nodes 340) within consensus network 310 determine that the proposed modifications to each of instance of ledger data store 352 (which collectively correspond to a distributed ledger on consensus network 310) can be verified.

Node 340A interprets the information describing the smart contract 101 (407). For instance, with reference to FIG. 2, smart contract module 355A analyzes template data 356A (which may be stored within a distributed ledger maintained by consensus network 310) and identifies one or more operations that are to be performed by smart contract module 355A. Smart contract module 355A executes the operations to enforce a smart contract corresponding to template data 356A and/or template 101. In some examples, when the smart contract executes or starts executing on consensus network 310, the smart contract previously described as executing on consensus network 210 may terminate and/or cease operating in favor of the smart contract executing on consensus network 310. In other examples, the smart contract executing on consensus network 210 may continue to operate for a period of time or indefinitely, and may execute concurrently, simultaneously, and/or in parallel with the smart contract executing on consensus network 310.

Figure 4B:
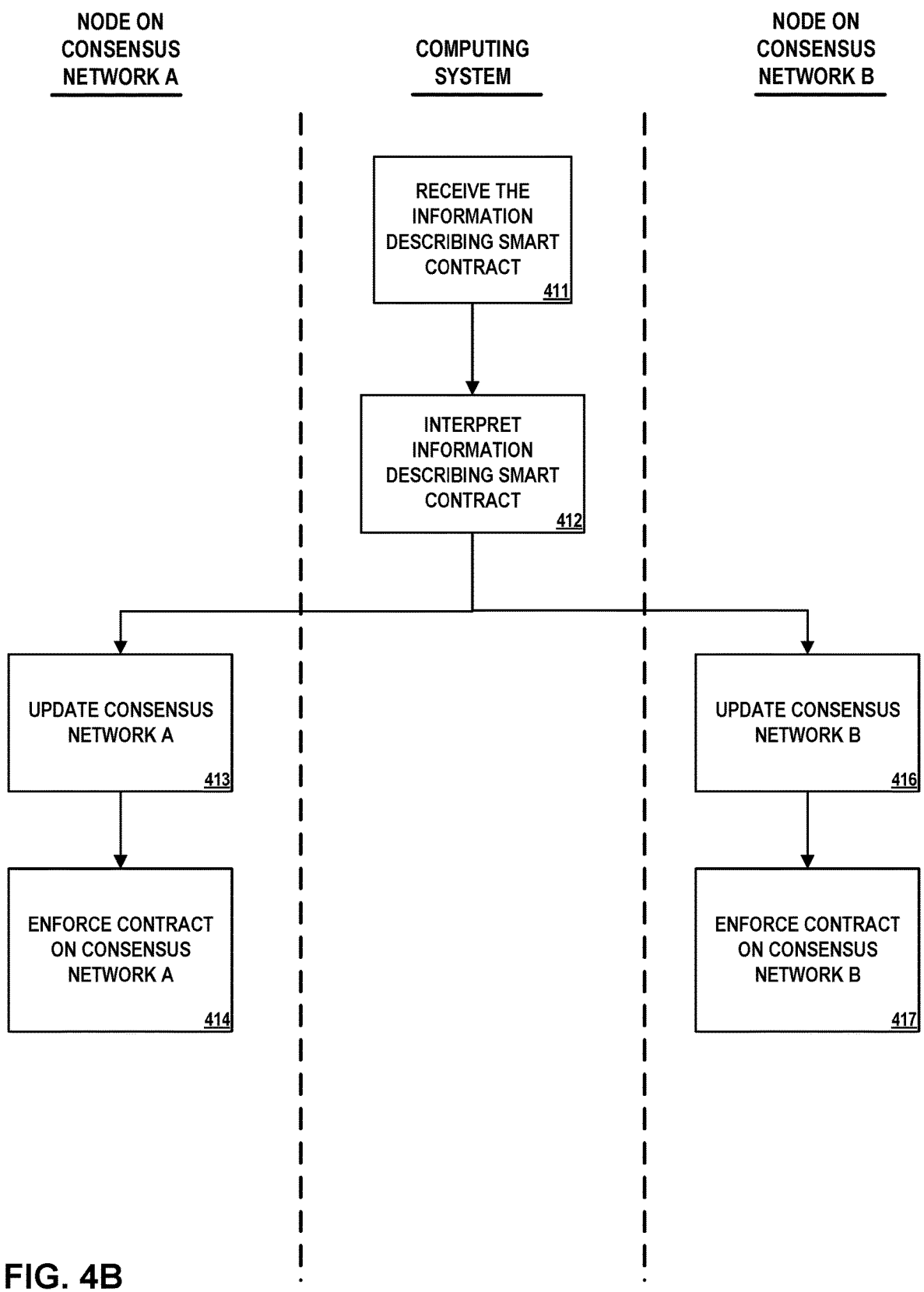
FIG. 4B is a flow diagram illustrating another example process for performing tasks in accordance with one or more aspects of the present disclosure.

FIG. 4B is a flow diagram illustrating another example process for performing tasks in accordance with one or more aspects of the present disclosure. The process of FIG. 4B is illustrated from three different perspectives: operations performed by an example node 240 (left-hand column to the left of dashed line), operations performed by an example computing system 112 (middle column between dashed lines), and operations performed by an example node 340 (right-hand column to the right of dashed line). In the example of FIG. 4B, the illustrated process may be performed by system 200 in the context illustrated in FIG. 2, where computing system 112 operates as a smart contract interpreter executing at a level above consensus networks 210 and 310. In other examples, different operations may be performed, or operations described in FIG. 4B as being performed by a particular component, module, system, and/or device may be performed by one or more other components, modules, systems, and/or devices. Further, in other examples, operations described in connection with FIG. 4B may be performed in a difference sequence, merged, omitted, or may encompass additional operations not specifically illustrated or described even where such operations are shown performed by more than one component, module, system, and/or device.

In the process illustrated in FIG. 4B, and in accordance with one or more aspects of the present disclosure, computing system 112 may receive, over network 105, information describing a smart contract (411). For instance, in some examples, and with reference to FIG. 2, client device 102 generates information describing a smart contract based on user input. Client device 101 outputs, over network 105, a signal. Computing system 112 detects, over network 105, the signal from client device 102. Computing system 112 determines that the signal includes information describing a smart contract, which is same as or is derived from the information, generated at client device 102, describing attributes of the smart contract.

Computing system 112 may interpret the information describing the smart contract (412). For instance, in some examples, computing system 112 analyzes the information describing the smart contract and determines that the information corresponds to template 101. Computing system 112 identifies one or more operations, specifications, and/or requirements of a smart contract corresponding to template 101.

Node 240A may update consensus network 210 to include, within a distributed ledger, a smart contract corresponding to template 101 (413). For instance, with reference to FIG. 2, computing system 112 determines, based on user input or otherwise, that a smart contract corresponding to template 101 should be deployed on consensus network 210. Computing system 112 outputs a signal over network 105 to consensus network 210. Communication unit 245A of node 240A detects a signal over consensus network 210. Communication unit 245A of node 240A outputs an indication of the signal to blockchain module 251A. Blockchain module 251A determines that the signal includes information sufficient to cause, or initiate a process of causing, a smart contract consistent with template 101 to be implemented on consensus network 210. Blockchain module 251A updates ledger data store 252A to include the smart contract. Blockchain module 251A causes communication unit 245A to output a signal over consensus network 210. Each of the nodes (or at least some of the nodes) within consensus network 210 detect a signal over consensus network 210 corresponding to a transaction adding the new smart contract. Each of blockchain modules 251 executing on nodes 240 follow a consensus protocol to update their respective ledger data stores 252. Eventually, a sufficient number of nodes 240 determine that the proposed transaction can be verified, and the new smart contract is added to the distributed ledger maintained by consensus network 210. Thereafter, each of nodes within consensus network 210 enforce the provisions of the smart contract in the manner specified by template 101 (414).

Alternatively or in addition, nodes 340 may later update consensus network 310 to include, within a distributed ledger maintained by consensus network 310, a smart contract corresponding to template 101 (416). For instance, in such an example, computing system 112 outputs a signal over network 105 to consensus network 310. Communication unit 345A of node 340A detects a signal over consensus network 310. Communication unit 345A of node 340A outputs an indication of the signal to blockchain module 351A. Blockchain module 351A determines that the signal includes information sufficient to implement a smart contract consistent with template 101 on consensus network 310. Blockchain module 351A updates ledger data store 352A to include the smart contract. Blockchain module 351A causes communication unit 345A to output a signal over consensus network 310. Each of the nodes (or at least some of the nodes) within consensus network 310 detect a signal over consensus network 310 corresponding to a transaction adding the new smart contract. Each of blockchain modules 351 executing on nodes 340 follow a consensus protocol to update their respective ledger data stores 352. Eventually, a sufficient number of nodes 340 determine that the proposed transaction can be verified, and the new smart contract is added to the distributed ledger on consensus network 310. Thereafter, each of nodes within consensus network 310 enforce the provisions of the smart contract in the manner specified by template 101 (417). In some examples, when the smart contract executes or starts executing on consensus network 310, the smart contract previously described as executing on consensus network 210 may terminate and/or cease operating in favor of the smart contract executing on consensus network 310. In other examples, the smart contract executing on consensus network 210 may continue to operate for a period of time or indefinitely, and may execute concurrently, simultaneously, and/or in parallel with the smart contract executing on consensus network 310.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, a limited number of devices (e.g., client devices 102, networks 105, consensus networks 110, nodes 140, nodes 240, nodes 340, as well as others) are shown within the Figures and/or in other illustrations referenced herein. However, techniques in accordance with one or more aspects of the present disclosure may be performed with many more of such systems, and collective references to components, devices, modules, and/or systems may represent any number of such components, devices, modules, and/or systems.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    receiving, by a first computing device, information describing a smart contract, wherein the first computing device is included within a first plurality of computing devices, each on a first consensus network that maintains a first distributed ledger, wherein the information describing the smart contract specifies a data model defining a dictionary data structure for storing a set of attributes of the smart contract, the set of attributes indexed in the dictionary data structure by a hash, and wherein the information describing the smart contract further specifies actions defining operations to be performed on the set of the attributes as identified by the hash;

performing, by the first computing device and in response to receiving the information describing the smart contract, operations to update the first distributed ledger, wherein performing the operations includes enabling each of the first plurality of computing devices to communicate over the first consensus network to share the information describing the smart contract;

interpreting, for the first consensus network and by at least one of the first plurality of computing devices executing an interpreter module developed for the first consensus network, the information describing the smart contract to determine a plurality of first smart contract operations that will implement the smart contract on the first consensus network, wherein interpreting includes configuring the plurality of first smart contract operations to be performed through calls to an application programming interface associated with the first consensus network;

performing, by at least one of the first plurality of computing devices, the plurality of first smart contract operations to execute the smart contract on the first consensus network;

receiving, by a second computing device, the information describing the smart contract, wherein the second computing device is included within a second plurality of computing devices, each on a second consensus network that maintains a second distributed ledger;

performing, by the second computing device and in response to receiving the information describing the smart contract, operations to update the second distributed ledger, wherein performing the operations includes enabling each of the second plurality of computing devices to communicate over the second consensus network to share the information describing the smart contract;

interpreting, for the second consensus network and by at least one of the second plurality of computing devices executing an interpreter module developed for the second consensus network, the information describing the smart contract to determine a plurality of second smart contract operations that will implement the smart contract on the second consensus network, wherein implementing includes configuring the plurality of second smart contract operations to be performed through calls to an application programming interface associated with the second consensus network, wherein the second consensus network is implemented on a different blockchain platform than the first consensus network, and wherein the interpreter module developed for the second consensus network is different than the interpreter module developed for the first consensus network; and performing, by at least one of the second plurality of computing devices, the plurality of second smart contract operations to execute the smart contract on the second consensus network.

2. The method of claim 1,
wherein the first consensus network implements the first distributed ledger pursuant to a first blockchain protocol, wherein performing the at least one of the plurality of first smart contract operations on the first consensus network includes modifying the first distributed ledger,
wherein the second consensus network implements the second distributed ledger pursuant to a second blockchain protocol, wherein performing the at least one of the plurality of second smart contract operations on the second consensus network includes modifying the second distributed ledger, and
wherein the first blockchain protocol is different than the second blockchain protocol.

3. The method of claim 1,
wherein the plurality of first smart contract operations are different than the plurality of second smart contract operations.

4. The method of claim 1,
wherein the first computing device is a node on the first consensus network, and wherein the second computing device is a node on the second consensus network.

5. The method of claim 1,
wherein the information describing the smart contract is a template that includes the data model defining the attributes of the smart contract and the plurality of methods executed by the smart contract.

6. The method of claim 5,
wherein the dictionary data structure is indexed by a hash.

7. The method of claim 5,
wherein each of the plurality of methods identify at least a portion of the data model modified by the method.

8. The method of claim 5,
wherein each of the plurality of methods further identify how the data model is modified by the method.

9. A system comprising:
a first consensus network that stores information in a first distributed ledger, wherein the first consensus network includes a first plurality of computing devices including a first computing device, and wherein the first computing device is configured to:
receive information describing a smart contract, wherein the information describing the smart contract specifies a data model defining a dictionary data structure for storing a set of attributes of the smart contract, the set of attributes indexed in the dictionary data structure by a hash, and wherein the information describing the smart contract further specifies actions defining operations to be performed on the set of the attributes as identified by the hash,
perform operations to update the first distributed ledger by enabling each of the first plurality of computing devices to communicate over the first consensus network to share the information describing the smart contract,
interpret, for the first consensus network and by executing an interpreter module developed for the first consensus network, the information describing the smart contract to determine a plurality of first smart contract operations that will implement the smart contract on the first consensus network by configuring the plurality of first smart contract operations to be performed through calls to an application programming interface associated with the first consensus network, and perform the plurality of first smart contract operations to execute the smart contract on the first consensus network; and a second consensus network that stores information in a second distributed ledger, wherein the second consensus network includes a second plurality of computing devices including a second computing device, and wherein the second computing device is configured to:
receive the information describing the smart contract,
perform operations to update the second distributed ledger by enabling each of the second plurality of computing devices to communicate over the second consensus network to share the information describing the smart contract,
interpret, for the second consensus network and by executing an interpreter module developed for the second consensus network, the information describing the smart contract to determine a plurality of second smart contract operations that will implement the smart contract on the second consensus network by configuring the plurality of second smart contract operations to be performed through calls to an application programming interface associated with the second consensus network, and wherein the interpreter module developed for the second consensus network is different than the interpreter module developed for the first consensus network, and
perform the plurality of second smart contract operations to execute the smart contract on the second consensus network.

10. The system of claim 9,
wherein the first consensus network implements the first distributed ledger pursuant to a first blockchain protocol,
wherein the second consensus network implements the second distributed ledger pursuant to a second blockchain protocol, and
wherein the first blockchain protocol is different than the second blockchain protocol.

11. The system of claim 9,
wherein the plurality of first smart contract operations are different than the plurality of second smart contract operations.

12. The system of claim 9,
wherein the first computing device is a node on the first consensus network, and wherein the second computing device is a node on the second consensus network.

13. The system of claim 9,
wherein the information describing the smart contract is a template that includes the data model defining the attributes of the smart contract and the plurality of methods executed by the smart contract.

14. The system of claim 13,
wherein the dictionary data structure is indexed by a hash.

15. The system of claim 13,
wherein each of the plurality of methods identify at least a portion of the data model modified by the method.

16. The system of claim 13,
wherein each of the plurality of methods further identify how the data model is modified by the method.

17. A method comprising:
receiving, by a first computing system on a first consensus network, information describing a smart contract, wherein the information describing the smart contract specifies a data model defining a dictionary data structure for storing a set of attributes of the smart contract, the set of attributes indexed in the dictionary data structure by a hash, and
wherein the information describing the smart contract further specifies actions defining operations to be performed on the set of the attributes as identified by the hash;
interpreting, by the first computing system, the information describing the smart contract to determine a plurality of first smart contract operations to implement the smart contract on a first distributed ledger maintained by the first consensus network;
receiving, by a second computing system on a second consensus network, the information describing the smart contract;
interpreting, by the second computing system, the information describing the smart contract to determine a plurality of second smart contract operations to implement the smart contract on a second distributed ledger maintained by the second consensus network, wherein the second consensus network is implemented on a different blockchain platform than the first consensus network;
performing, by the first computing system, operations to cause the first distributed ledger maintained by the first consensus network to implement the smart contract on the first consensus network, wherein performing the operations includes enabling each of a first plurality of computing devices to communicate to update the first distributed ledger to share the information describing the smart contract; and
performing, by the second computing system, operations to cause the second distributed ledger maintained by the second consensus network to implement the smart contract on the second consensus network, wherein performing the operations includes enabling each of a second plurality of computing devices on the second consensus network to communicate to update the second distributed ledger to share the information describing the smart contract, and wherein the operations to cause the second distributed ledger maintained by the second consensus network to implement the smart contract on the second consensus network are different than the operations to cause the first distributed ledger maintained by the first consensus network to implement the smart contract on the first consensus network.

18. The method of claim 17,
wherein performing operations to cause the first distributed ledger maintained by the first consensus network to implement the smart contract on the first consensus network includes performing operations pursuant to a first blockchain protocol; and
wherein performing operations to cause the second distributed ledger maintained by the second consensus network to implement the smart contract on the second consensus network includes performing operations pursuant to a second blockchain protocol.

19. The method of claim 18,
wherein the first blockchain protocol is different than the second blockchain protocol.

20. The method of claim 17,
wherein the information describing the smart contract is a template that includes the data model defining the attributes of the smart contract and the plurality of methods executed by the smart contract.

* * * * *